United States Patent [19]
Bryant

[11] 3,759,452
[45] Sept. 18, 1973

[54] SELF-CLEANING METAL TRAP FOR RUBBISH SHREDDING MACHINES

[75] Inventor: James G. Bryant, Greencastle, Ind.

[73] Assignee: Bryant-Poff, Inc., Coatesville, Ind.

[22] Filed: Dec. 22, 1971

[21] Appl. No.: 210,667

[52] U.S. Cl. .......................... 241/82, 241/96, 241/97
[51] Int. Cl. .............................................. B02c 19/00
[58] Field of Search .................. 241/61, 69, 73, 82, 241/84, 86, 96, 97, 185; 209/255, 256, 257, 283

[56] References Cited
UNITED STATES PATENTS

| | | |
|---|---|---|
| 2,204,069 | 6/1940 | Clement.............................. 241/82 |
| 2,249,109 | 7/1941 | Botimer........................... 209/257 X |
| 2,775,168 | 12/1956 | Baxter, Jr. ......................... 241/96 X |
| 3,627,212 | 12/1971 | Stanton............................... 241/73 |

Primary Examiner—Granville Y. Custer, Jr.
Attorney—Arthur Raisch et al.

[57] ABSTRACT

A self-cleaning metal trap is positioned on the shredding machine to remove foreign material from the shredding chamber thereby preventing damage to the shredder. The metal trap is provided with a trough which collects the material ejected from the shredding chamber. A motor-driven conveyor at the bottom of the trough removes the accumulated contents of the trap so that the shredder may be continuously operated for as long as desired.

6 Claims, 3 Drawing Figures

PATENTED SEP 18 1973

3,759,452

INVENTOR.
JAMES G. BRYANT
BY
Barnes, Kisselle, Raisch & Choate
ATTORNEYS

SELF-CLEANING METAL TRAP FOR RUBBISH SHREDDING MACHINES

This invention relates to rubbish shredding machines and in particular to apparatus for safely and efficiently removing from the machine any foreign material which may enter the machine along with rubbish to be shredded.

Rubbish shredding machines are usually designed in view of the type of rubbish to be shredded. For example, a shredder which is intended to process only lighter material such as paper, cardboard, small wood boxes, etc., cannot process heavier material such as hardwood blocks, metal scraps, etc. Even more powerful shredders cannot process hardened metals such as nuts, bolts, small pieces of hardware, etc., without damage to the machine. In view of the impracticality of segregating such offending materials from the rubbish which is intended to be shredded prior to loading the shredder, rubbish shredding machines have in the past been provided with "metal traps" for removing the offending items from the machine so that the machine is not overloaded or otherwise damaged. The metal trap is typically positioned on the shredder adjacent the shredding chamber and has an opening into the shredding chamber which is arranged to catch the offending items, which tend to be thrown outwardly of the shredding chamber by the churning and tumbling action of the shredder. While the capacity of a metal trap is usually sufficient to handle occasional foreign material in the rubbish which is being shredded, the particular nature of the rubbish may be such that partially shredded rubbish is also thrown into the metal trap along with the foreign material, thereby filling the trap in short order. Because it is unsafe for personnel to clean out the metal trap while the shredder is being operated, the shredder must be shut down whenever the metal trap becomes packed with material. Accordingly, it can be understood that depending upon the type of rubbish being processed, the shredder may be frequently shut down to permit the metal trap to be cleaned out and as a consequence, the operating efficiency of the shredder is significantly reduced.

The primary object of the present invention is to eliminate the need to shut down the shredding machine for the purpose of removing the accumulated contents of the metal trap.

A further object is to improve the safety conditions attendant with the operation of a shredding machine by eliminating the need for personnel to clean out the metal trap.

Other objects of the invention will become apparent in the following description and the accompanying drawing in which.

Figure 1:
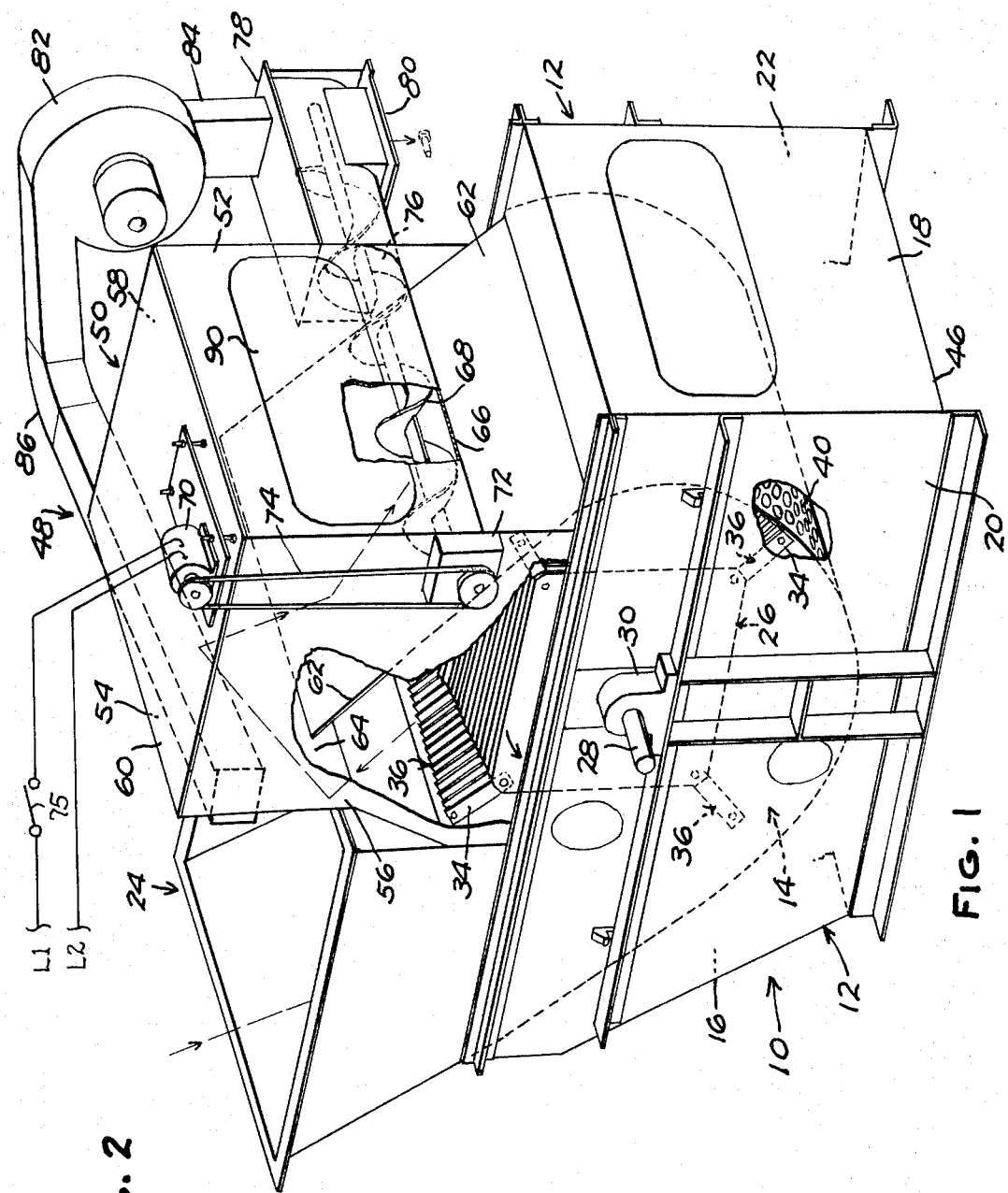
FIG. 1 is a perspective view of a rubbish shredding machine embodying the present invention and having portions broken away.

Looking now at FIG. 1, a rubbish shredding machine 10 has a housing 12 surrounding a shredding chamber 14. Housing 12 has end walls 16 and 18 and side walls 20 and 22. A hopper 24, through which rubbish is fed into shredding chamber 14, is mounted on the rearward end of housing 12 as viewed in FIG. 1. A rotor assembly 26 is mounted for rotation within housing 12 by journalling the ends of the rotor shaft 28 within bearings 30 which are mounted on the reinforcing structure of housing 12. Rotor assembly 26 is built up of a plurality of square plates 32 axially stacked on rotor shaft 28. Individual shredding blades 34 are mounted between adjacent plates 32 at each of the four corners. Thus, the blades 34 are arranged in four sets 36 disposed 90° apart about the rotor axis, with each set extending across the width of housing 12. A perforated metal sheet, or screen, 40 of the same width as the width of housing 12 is curved about the rotor axis and extends in approximately a semicircle from the inner end of the inclined hopper wall 42 (FIG. 2) around to a level at approximately the top of housing 12. Sheet 40 is spaced radially outwardly of the radially outer ends of blades 34 and is securely mounted on housing 12 for cooperation with rotor 26 in shredding rubbish in the following fashion. Rotor 26 is driven in the counterclockwise direction (as indicated by arrow 44, FIG. 2) by any suitable drive arrangement (for example, an electric motor) so that as rubbish is introduced into shredding chamber 41 via hopper 24, the oncoming blade set 36 cuts into the rubbish drawing it downwardly against perforated sheet 40. The interaction of the rubbish between the rotating blade sets 36 and perforated sheet 40 causes the rubbish to be slashed and cut by blades 36 until it is ultimately reduced to fragments which pass through the openings of perforated sheet 40 and out the open bottom 46 of housing 12. The shredded rubbish may be collected in a bin or any suitable receptacle.

Figure 2:
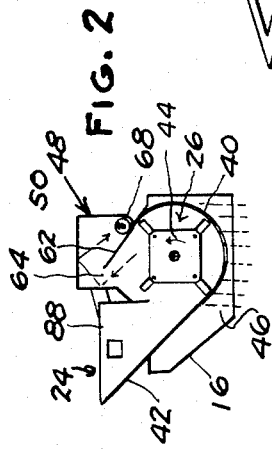
FIG. 2 is a reduced vertical sectional view through the shredder of FIG. 1.
Figure 3:
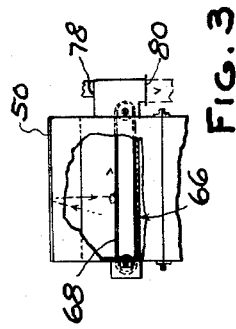
FIG. 3 is a reduced end view of the shredder of FIG. 1 having a portion broken away and including a modification to the embodiment of FIG. 1.

The improvement in the shredding machine which is provided by the present invention is directed to the self-cleaning metal trap 48 which is mounted on the top of housing 12 above shredding chamber 14. Trap 48 has the same width as housing 12 and encloses the top of housing 12 by means of a cover 50 which has end walls 52 and 54, side walls 56 and 58 and a top wall 60. A partition 62 forms a common wall between shredding chamber 14 and the interior of trap 48. Partition 62 extends across the full width of trap 48 and inclines upwardly and rearwardly from the top of housing 12. The lower forward edge of partition 62 is attached to housing 12 approximately along the line of attachment of the upper end edge of sheet 40 to the top of housing 12. The upper rear edge of partition 62 terminates short of end wall 54 so that an intake opening 64 is provided between the interior of trap 48 and shredding chamber 14. With this arrangement, partition 62 forms both a generally tangential extension of screen 40 toward intake opening 64 and also the lower wall of trap 48. The lower edge of end wall 52 is attached to partition 62 to thereby define a trough 66 which extends across the full width of the trap 48. A motorized conveyor 68 is mounted within trap 48 at the bottom of trough 66. A screw-type conveyor is illustrated in FIGS. 1 and 2 while a belt-type conveyor is illustrated in FIG. 3. The screw-type conveyor 68 is operated by an electric motor 70 mounted on the top wall 60 of cover 50. A reducer 72 is mounted on side wall 56 of cover 50 and operatively connected to conveyor 68. Motor 70 is operatively connected to reducer 72 by a belt-and-pulley arrangement 74 so that conveyor 68 is turned at relatively low rpm. Motor 70 is turned on by closing a switch 75 to conduct electric current through electric lines $L_1$ and $L_2$ to the motor. A discharge opening 76 is provided in side wall 58 at the further end of trough 66 as viewed in FIG. 1. Preferably, the length of the trough is extended by a covered through extension 78 which is mounted alongside cover 50 and aligned with opening 76. Screw 68 may extend through opening 76 into trough extension 78 as far as a discharge opening 80 in the bottom of extension 78 at the further end thereof.

If desired, shredder 10 may be provided with a recycling unit for automatically reprocessing any partially shredded rubbish which may have entered trap 48 along with foreign material. The recycling unit is adapted to remove the lighter, partially shredded material (e.g., paper, cardboard, etc.) from the trap prior to discharge of the trap contents through opening 80. For this purpose, the recycling unit in FIG. 1 has a conventional blower unit 82 mounted on shredder 10 by any suitable mounting means (not shown). An intake duct 84 extends down from blower unit 82 and opens into the top of trough extension 78 above opening 80. A discharge duct 86 leads from the blower discharge and opens into the side wall 88 of hopper 24. Blower unit 82 may be of any suitable type, for example, one having a fan driven by an electric motor, and is adapted when operated to suck the partially shredded rubbish up from the top of trough extension 78 and blow the same back into hopper 24. It is to be appreciated that the illustrated arrangement is merely exemplary and that the recycling unit may be connected between the trap and the shredding chamber in other suitable fashions. Preferably, blower unit 82 is operated concurrently with rotor 26.

The self-cleaning trap operates as follows. During the shredding operation, the foreign material is forcibly propelled outwardly of shredding chamber 14 and through intake opening 64 into trap 48. Additionally, partially shredded rubbish may also enter the trap in the same fashion. The material so ejected falls to the bottom of trough 66 and is automatically removed by conveyor 68. Conveyor 68 moves the collected material lengthwise along the trough and trough extension for gravity discharge through opening 80 into a bin or other receptacle. The foreign, heavier materials such as nuts, bolts, etc., fall through opening 80 while the lighter, partially shredded rubbish is sucked up by blower unit 82 and blown back into hopper 24 for subsequent reprocessing in shredding chamber 14. Depending upon the particular arrangement desired to remove the accumulated contents of the metal trap, motor 70 may be operated continuously with the operation of the shredder by slaving the operation of switch 75 to the operation of the shredder rotor, or may be intermittently operated at selected periods during the operation of the shredder by periodically timing the operation of switch 75 to the operation of the rotor. It is to be observed that because the metal trap is self-cleaning, there is no need for the shredder to be shut down because of a packed metal trap. Therefore, the shredder may be continuously operated as long as desired. A covered access opening 90 in cover 50 permits access to the conveyor for service if such is needed.

I claim:

1. In a rubbish shredding machine having a rubbish shredding chamber wherein rubbish is shredded, that improvement which comprises a self-cleaning metal trap adjacent the shredding chamber, said trap comprising means forming an intake opening from the shredding chamber through which foreign material may be ejected from the chamber into the trap, a trough for collecting the ejected material within the trap, means forming a discharge opening in said trough, conveyor means within the trough for removing the collected contents from the trough through the discharge opening to thereby prevent the trap from becoming fully packed with material ejected from the shredding chamber into the trap, and recycling means for returning partially shredded rubbish from the metal trap to the rubbish shredding chamber comprising duct means extending from the trap to the rubbish shredding chamber and means for moving the partially shredded rubbish through the duct means.

2. The combination of claim 1 wherein the discharge opening is at one end of the trough.

3. The combination of claim 1 including a trough extension on the trap over the discharge opening for forming a continuation of the trough from the discharge opening and means forming an opening in the trough extension through which the collected contents of the trap are discharged after passing from the trough through the discharge opening and into the trough extension.

4. The combination of claim 3 wherein said duct means connect with said trough extension at a position generally diametrically opposite the opening in the trough extension through which the contents of the trap are discharged.

5. The combination of claim 3 wherein said last-mentioned opening in said trough faces in a generally downward direction and said duct means connect with said duct extension, the connection between said duct means and said duct extension registering with said last-mentioned opening in a direction longitudinally of said trough extension and said duct means extending upwardly from said trough extension.

6. The combination of claim 1 wherein the means for moving the partially shredded rubbish through the duct means comprises blower means adapted to suck partially shredded rubbish from the trap, to move the same through the duct means, and to discharge the same back into the shredding chamber.

* * * * *